United States Patent
Hebrank

(10) Patent No.: US 6,601,534 B2
(45) Date of Patent: Aug. 5, 2003

(54) METHODS AND APPARATUS FOR PUNCHING THROUGH EGG SHELLS WITH REDUCED FORCE

(75) Inventor: John H. Hebrank, Durham, NC (US)

(73) Assignee: Embrex, Inc., Research Triangle Park, NC (US)

( * ) Notice: Subject to any disclaimer, the term of this patent is extended or adjusted under 35 U.S.C. 154(b) by 0 days.

(21) Appl. No.: 10/043,025

(22) Filed: Jan. 9, 2002

(65) Prior Publication Data

US 2003/0127054 A1 Jul. 10, 2003

(51) Int. Cl.⁷ .................................................. A01K 45/00
(52) U.S. Cl. ....................................................... 119/6.8
(58) Field of Search ............................ 119/6.8, 6.5, 6.6, 119/50.7

(56) References Cited

U.S. PATENT DOCUMENTS

| | | | | |
|---|---|---|---|---|
| 3,377,989 A | * | 4/1968 | Sandhage et al. ............. 119/6.8 |
| 4,040,388 A | * | 8/1977 | Miller ............................ 119/6.8 |
| 4,458,630 A | | 7/1984 | Sharma et al. ................. 119/1 |
| 4,469,047 A | * | 9/1984 | Miller ............................ 119/6.8 |
| 4,681,063 A | * | 7/1987 | Hebrank ........................ 119/6.8 |
| 4,903,635 A | * | 2/1990 | Hebrank ........................ 119/6.8 |
| 5,028,421 A | | 7/1991 | Fredericksen et al. ......... 424/85 |
| 5,285,750 A | * | 2/1994 | Molian et al. ................ 119/174 |
| 6,032,612 A | | 3/2000 | Williams ....................... 119/6.8 |
| 6,286,455 B1 | | 9/2001 | Williams ....................... 119/6.8 |

* cited by examiner

Primary Examiner—Yvonne Abbott
(74) Attorney, Agent, or Firm—Myers Bigel Sibley & Sajovec

(57) ABSTRACT

Methods and apparatus for forming an opening in a shell of an avian egg such that the potential for cracking is greatly reduced are provided and comprise moving a punch through an egg shell at speeds equal to or greater than thirty (30) inches per second. Punches may be driven via various devices including gravity-assisted devices, spring-assisted devices, solenoid-assisted devices, and fluid-assisted (e.g., compressed air, compressed nitrogen, liquid, etc.) devices. The shell of an egg may be pierced without causing cracking by hurling one or more small projectiles at the egg shell at speeds in excess of 30 inches per second. A punch may be mounted on a piezoelectric actuator configured to vibrate at frequencies in a range of between about 1,000 Hz and about 100,000 Hz. These frequencies effectively cause a punch to move at speeds in excess of 30 inches per second.

41 Claims, 7 Drawing Sheets

METHODS AND APPARATUS FOR PUNCHING THROUGH EGG SHELLS WITH REDUCED FORCE

FIELD OF THE INVENTION

The present invention relates generally to eggs and, more particularly, to methods and apparatus for processing eggs in ovo.

BACKGROUND OF THE INVENTION

Injections of various substances into avian eggs have been employed to decrease post-hatch mortality rates, increase the potential growth rates or eventual size of the resulting chicken, and even to influence the gender determination of the embryo. Similarly, injections of antigens into live eggs have been employed to incubate various substances used in vaccines which have human or animal medicinal or diagnostic applications. Examples of substances that have been used for, or proposed for, in ovo injection include vaccines, antibiotics and vitamins. In addition, removal of material from avian eggs has been employed for various purposes, such as testing and vaccine harvesting. Examples of in ovo treatment substances and methods of in ovo injection are described in U.S. Pat. No. 4,458,630 to Sharma et al., U.S. Pat. No. 5,028,421 to Fredericksen et al., and U.S. Pat. Nos. 6,032,612 and 6,286,455 to Williams, the contents of which are incorporated by reference herein in their entireties.

An egg injection device conventionally is designed to operate in conjunction with commercial egg carrier devices or flats. The injection device may comprise a plurality of injection needles which operate simultaneously or sequentially to inject a plurality of eggs, or a single injection needle used to inject a plurality of eggs. The injection device may comprise an "injection head" which comprises the injection needle or needles, and wherein each injection needle is in fluid communication with a source containing a treatment substance to be injected. A single fluid source may supply all of the injection needles in an injection device, or multiple fluid sources may be utilized.

An exemplary in ovo injection apparatus 10 is illustrated in FIG. 1. The illustrated apparatus 10 includes a flat 15 for carrying eggs 20, a stationary base 16, and a plurality of injection delivery devices, or heads, 25 with fluid delivery means such as lumens or needle(s) positioned therein in accordance with known techniques. The flat 15 holds a plurality of eggs 20 in a substantially upright position. The flat 15 is configured to provide external access to predetermined areas of the eggs 20. Each egg 20 is held by the flat 15 so that a respective end thereof is in proper alignment relative to a corresponding one of the injection heads 25 as the injection head 25 advances towards the base 16 of the apparatus.

In ovo injections of substances (as well as in ovo extractions of material) typically occur by piercing an egg shell to form an opening (e.g., via a punch), extending an injection needle through the hole and into the interior of the egg (and in some cases into the avian embryo contained therein), and injecting treatment substance(s) through the needle and/or removing material therefrom. For example, each injection head 25 of the apparatus of FIG. 1 includes a punch 26 and an injection needle 27 with the punch surrounding the needle 27 in coaxial relationship therewith as illustrated in FIGS. 2A–2B. The punch 26 is configured to pierce the egg shell and the needle 27 is configured to deliver a substance into the egg (FIG. 2B).

Egg flats utilized in conjunction with in ovo injection devices contain an array of pockets that are configured to support a respective plurality of eggs in a generally upright orientation. An exemplary egg flat 30 is illustrated in FIGS. 3A–3B. The illustrated egg flat 30 includes a plurality of rows of pockets 32. Each pocket 32 is configured to receive one end 20a of a respective egg 20 so as to support the respective egg 14 in a substantially vertical position. Each pocket 32 of the illustrated egg flat 30 contains a plurality of tabs 34 (FIG. 3B) that are configured to support a respective egg as illustrated in FIG. 4.

Although effective in supporting eggs during transport, these support tabs 34 can damage eggs during in ovo processing. The force applied to an egg by an in ovo processing punch can push the egg downwardly against the support tabs 34 with sufficient force to cause the egg to crack. In addition to reducing hatch rates, cracked eggs can lead to contamination of other eggs within an egg flat, as well as contamination of processing equipment.

In addition, support tabs in conventional egg flats are somewhat flexible and can deflect when an egg supported thereby is punched. In addition, conventional egg flats are typically somewhat flexible. As such, during punching of a plurality of eggs, the egg flat structure can warp and/or twist. This warping and/or twisting of the egg flat can add to the deflection of the support tabs such that when the force of punching is removed the egg flat and tabs can grip an egg, thereby making removal from the egg flat difficult. Accordingly, it would be desirable to be able to punch through the shell of an egg supported within an egg flat without causing the egg to crack and without causing the egg to become stuck within the egg flat.

SUMMARY OF THE INVENTION

In view of the above discussion, methods and apparatus for forming an opening in a shell of an avian egg such that the potential for cracking is greatly reduced are provided and comprise moving a punch through an egg shell at speeds equal to or greater than thirty (30) inches per second. In order to protect the air cell of an egg, to avoid contamination, and, in the case of allantois sampling, to avoid penetrating an adjacent membrane, punch travel is stopped immediately upon entering an egg. According to embodiments of the present invention, punch travel is stopped via energy-absorbing material positioned between an egg and the housing or support structure of the punch. According to other embodiments of the present invention, punch travel can be stopped by the punching tool body which can be clamped during punching. Punches may be driven via various devices including gravity-assisted devices, spring-assisted devices, solenoid-assisted devices, voice coil-assisted devices, and fluid-assisted (e.g., compressed air, compressed nitrogen, liquid, etc.) devices. Punches according to embodiments of the present invention may also be configured to deliver treatment substances into eggs.

According to embodiments of the present invention, the shell of an egg may be pierced without causing cracking by hurling one or more small projectiles at the egg shell at speeds in excess of 30 inches per second. According to embodiments of the present invention, a non-toxic, biodegradable material (e.g., ice) is used as a projectile. According to embodiments of the present invention, a projectile may contain a predetermined dosage of a treatment substance.

According to embodiments of the present invention, the shell of an egg may be pierced without causing cracking by moving a punch through an egg shell at speeds equal to or greater than thirty (30) inches per second and then hurling one or more small projectiles (e.g., ice) within an egg to penetrate the membrane at the floor of the air cell and/or to deliver a predetermined dosage of a treatment substance.

According to embodiments of the present invention, a punch may be mounted on a piezoelectric actuator or electromagnetic actuator configured to vibrate at frequencies in a range of between about 1,000 Hz and about 100,000 Hz. These frequencies effectively cause a punch to move at speeds in excess of 30 inches per second.

Downward motion of an egg due to egg flat and support tab deflection during punching increases the energy required for punching the egg. For example, eggs typically move downward about 1/8 inch to 3/16 inch during punching due to egg flat and support tab flexure caused by conventional punching forces averaging about six pounds per egg. Total energy expended by a punch tool, U, equals force integrated over distance (or in the case of a linear relationship between egg deflection and force U=0.5*F*d where F is peak punch force and d is maximum flat deflection). Total punch work is therefore about 0.03 to 0.04 foot-pounds via conventional punching techniques. Measurements of energy required to punch a rigidly supported egg are about 1/100 foot-pound. Thus conventional punching with the attendant flat deflection can increase the energy required to punch an egg by a factor of three to four.

Embodiments of the present invention can be advantageous over conventional egg shell punching apparatus and methods because less energy may be required to form openings within egg shells. Punching speeds in excess of 30 inches per second do not appear to allow energy to be expended in deflecting the support tabs within egg flat pockets, the egg flat, or the structure supporting either the egg flat or the punch tool(s). As a result, smaller punch actuators that are lighter in weight and less expensive/complex than conventional actuators may be utilized, which may result in cost savings.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF THE INVENTION

Figure 1:
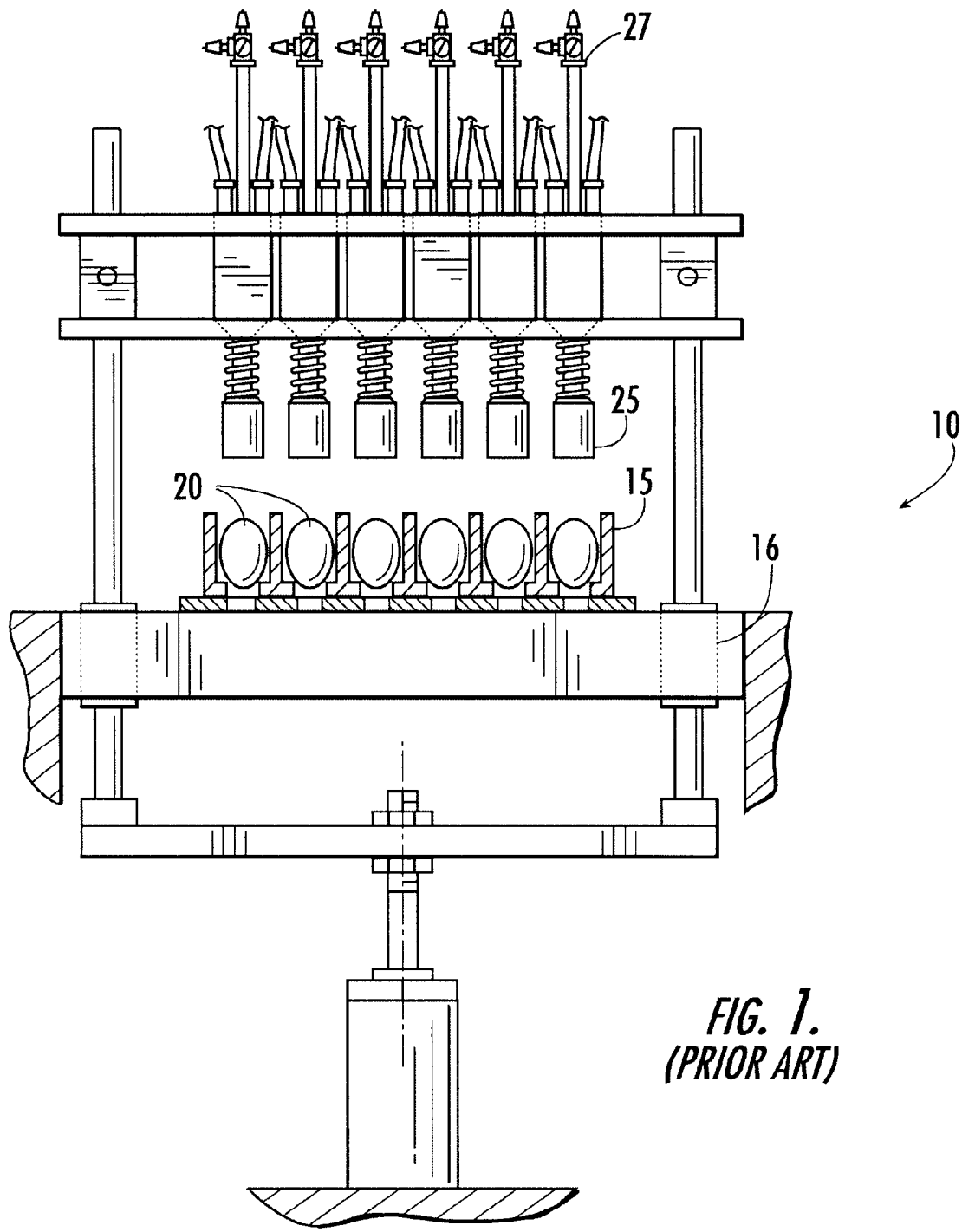
FIG. 1 is a side elevation view of an exemplary in ovo processing apparatus that is configured to form an opening in an egg shell and inject material into an egg and/or remove material from an egg.
Figure 2A:
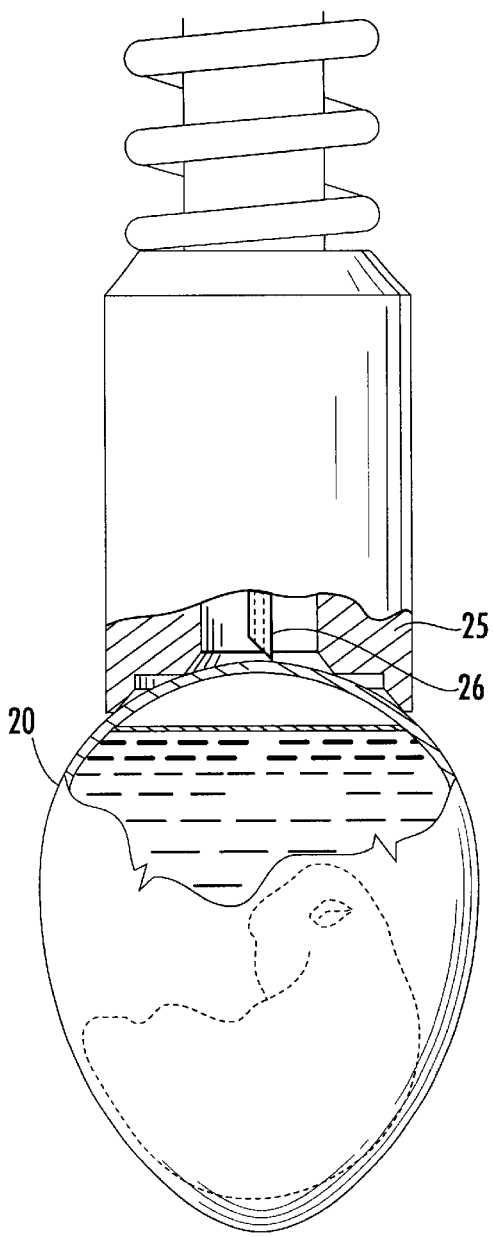
FIGS. 2A–2B are cross-sectional views of a lower portion of an injector head of the apparatus of FIG. 1 wherein a punch is about to pierce the shell of an egg (FIG. 2A), and wherein a needle is injecting material into an egg after an opening has been formed in the shell thereof (FIG. 2B).
Figure 2B:
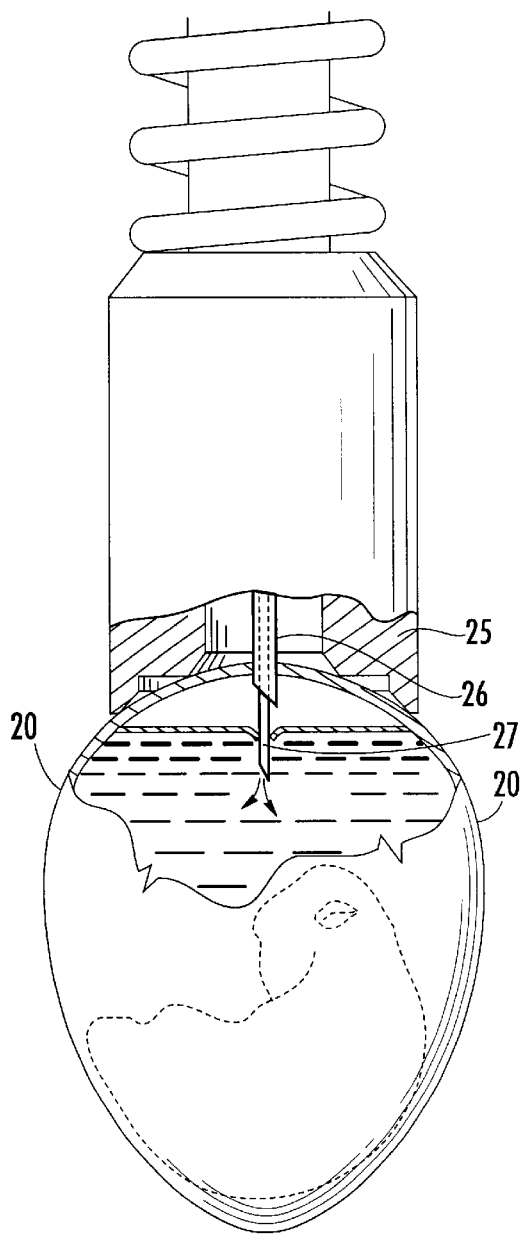
Figure 3A:
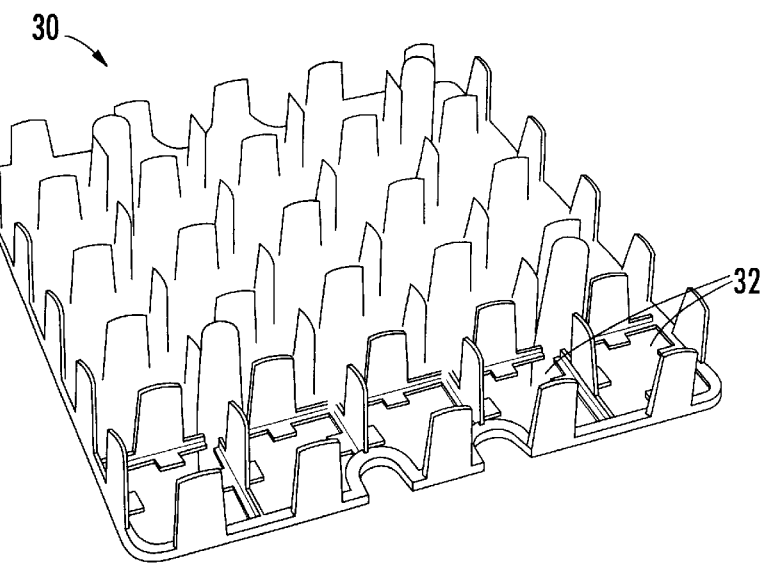
FIG. 3A is a perspective view of a conventional egg flat.
Figure 3B:
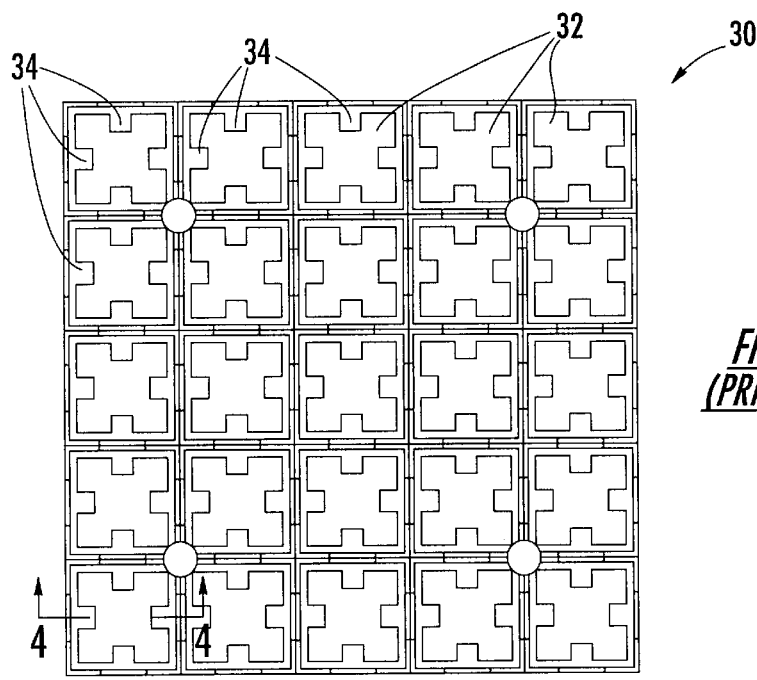
FIG. 3B is a top plan view of the egg flat of FIG. 3A.
Figure 4:
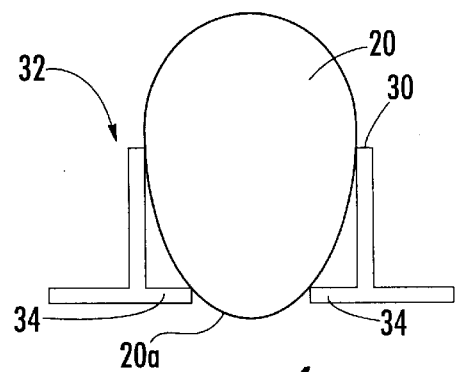
FIG. 4 is a cross-sectional view of an egg supported within a pocket of the egg flat of FIG. 3A.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Methods and apparatus according to embodiments of the present invention may be practiced with any type of avian egg, including, but not limited to, chicken, turkey, duck, geese, quail, ostrich, emu, squab, game hen, and pheasant eggs. Moreover, methods and apparatus according to embodiments of the present invention may be utilized to punch the shell of an egg at any time during the embryonic development period (also referred to as the incubation period) thereof. Embodiments of the present invention are not limited to a particular day during the embryonic development period.

An exemplary egg injection device, with which methods and apparatus for punching eggs according to embodiments of the present invention may be utilized, is the INOVOJECT® automated injection device (Embrex, Inc., Research Triangle Park, N.C.). However, embodiments of the present invention may be utilized with any in ovo processing device.

Methods and apparatus according to embodiments of the present invention may be utilized to inject eggs in various orientations. Embodiments of the present invention are not limited only to in ovo injection devices that inject eggs in the illustrated orientation.

Applicant has unexpectedly discovered that by moving a punch through the shell of an egg supported within an egg flat at speeds in excess of thirty (30) inches per second, and more particularly at speeds in excess of forty (40) inches per second, shell cracking resulting from conventional punching operations wherein punching speeds are less than or equal to about five (5) inches per second can be reduced significantly.

Although not completely understood and not wanting to be bound by any theory of operation, Applicant believes that when the punching rate exceeds about 30 inches per second, the force necessary to produce a hole in an egg shell is sustained for such a short period of time that the mass of the egg does not permit the force to move into the compliant support tabs of the egg flat such that a counter force is developed by the support tabs. Moreover, Applicant has unexpectedly discovered that less energy is required to penetrate the shell of an egg when punching rates exceed about 30 inches per second and presumes this is because energy is not expended in deflecting egg flat supporting tabs or other portions of an egg flat.

A dynamic analysis of punching in excess of 30 inches per second models punching as a momentum transfer from a punch to an egg as the punch penetrates the egg, followed by an energy analysis of egg motion into an flat. The momentum, mass times velocity (M*V), imparted to an egg by a punch is the time integral of punch force or impulse (Ft). Egg flat deflection (egg flat force) is then determined by the deflection necessary to absorb the kinetic energy of an egg (0.5M*V*V). The deflection is given by 0.5*F*F/K where F is peak force of the egg flat on the egg and K is egg flat stiffness.

In ovo injection procedures may require that the depth of penetration of a punch into an egg be limited in order to protect the air cell, to avoid contamination, and, in the case of allantois sampling, to avoid penetrating an adjacent membrane. Limiting punch travel within an egg requires reducing punch velocity to zero inches per second (i.e., stopping the punch) immediately upon entering an egg. According to embodiments of the present invention, punch travel is limited through the use of energy-absorbing material positioned between the egg shell and the punching device. An exemplary urethane energy-absorbing material is Sorbothane® brand energy-absorbing material, available from Sorbothane, Inc., Kent Ohio. Sorbothane® brand energy-absorbing material is a visco-elastic material widely recognized for its excellent vibration and shock absorption characteristics. Sorbothane® brand energy-absorbing material also exhibits high damping properties over a broad temperature and frequency range. Other compliant materials such as Neoprene may be used to spread contact forces due to punch deceleration across an egg. Materials that dissipate energy rather than spring back are preferable. Conventional punching methods that clamp a punching tool while it punches can incur excessive punch penetration into an egg as the deflected egg moves back to its original position after the punch penetrates the shell. For situations where an egg is deflected downward during punching, the egg may rebound upward ⅛ of an inch or more as an egg flat springs back to it's original shape after the punch moves through the shell and the punch force goes from 6 pounds back to nil.

According to embodiments of the present invention, punch travel may be limited by a stop integral with a punch tool. In this embodiment, punch tool motion may be restricted either by clamping the punch tool or having a punch tool of sufficient mass to limit motion thereof.

Figures 5, 6:
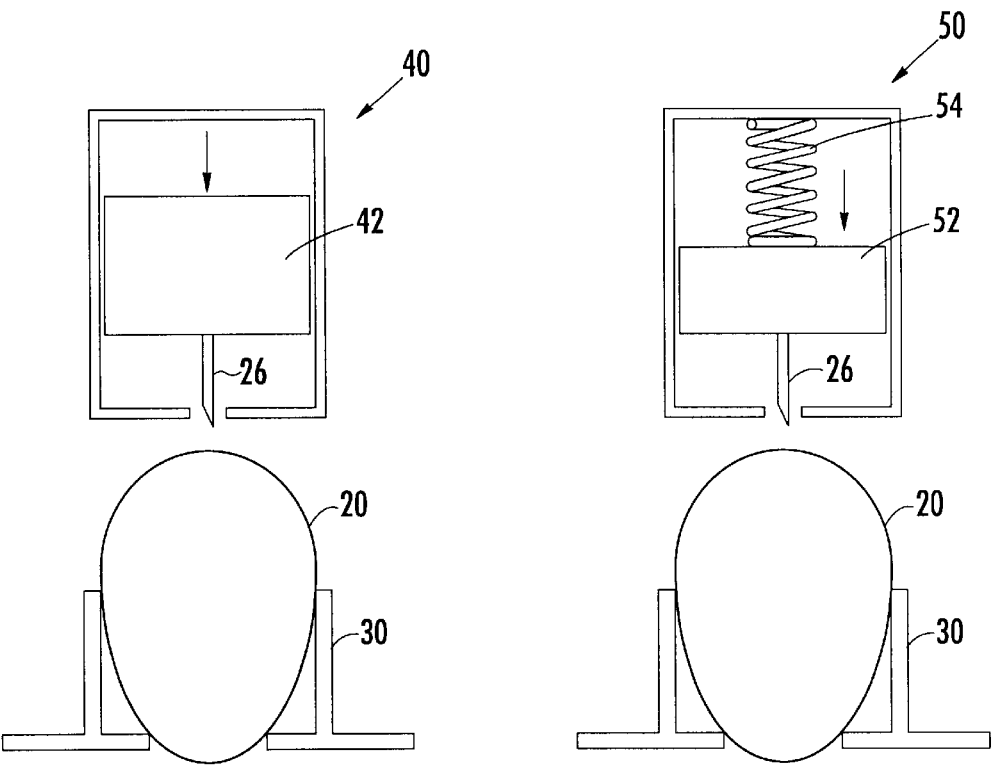
FIG. 5 illustrates a gravity-assisted device for forming an opening within an egg shell according to embodiments of the present invention.
FIG. 6 illustrates a spring-assisted device for forming an opening within an egg shell according to embodiments of the present invention.

According to embodiments of the present invention, punching speeds in excess of 30 inches per second may be achieved in various ways including, but not limited to, gravity-assisted punching, spring-assisted punching, solenoid-assisted punching, voice coil-assisted punching, and fluid-assisted (e.g., compressed air, compressed nitrogen, liquid) punching. With respect to gravity-assisted punching, a punch may be dropped from a predetermined height above an egg to achieve a punching speed in excess of 30 inches per second. FIG. 5 illustrates an exemplary gravity-assisted device 40 for forming an opening within an egg shell according to embodiments of the present invention. The illustrated device 40 includes a punch 26 fixedly attached to a member 42 that is configured to fall under the force of gravity to form an opening in an egg shell. Preferably, member 42 has sufficient mass so that about ¹⁄₁₀₀ foot-pound of energy is available for punching. Thus, for a fall of d feet the member 42 would have a mass weighing 0.01/d. For example, a punch and mass that fall 1.2 inches (¹⁄₁₀ foot) to the shell should weigh at least ¹⁄₁₀ pound.

A distance of about one to two inches (1–2 in.) above the shell of an egg should be sufficient to generate a desired punching speed. This is predicted by the formula S=V*V/(2*A) where S is the drop distance before punch contact (inches), V is the desired punch impact speed (inches per second), and A is the free-fall acceleration of gravity (12*32.2 inches per second per second). The punch 26 can be returned to its original position via any manner known to those skilled in this art including mechanically, electromagnetically, and/or via suction. A gravity-assisted device according to embodiments of the present invention may have various configurations and is not limited to the illustrated embodiment.

With respect to spring-assisted punching, a punch may be spring-propelled to achieve a punching speed in excess of 30 inches per second. Preferably, a spring imparts energy to a punch around at least about ¹⁄₁₀₀ foot-pounds. FIG. 6 illustrates a spring-assisted device 50 for forming an opening within an egg shell according to embodiments of the present invention. The illustrated device 50 includes a punch 26 fixedly attached to a member 52 that is urged downwardly by a spring 54 to form an opening in an egg shell. The punch 26 can be returned to its original position via any manner known to those skilled in this art including mechanically, electromagnetically, and/or via suction. A spring-assisted device according to embodiments of the present invention may have various configurations and is not limited to the illustrated embodiment.

Figure 7:
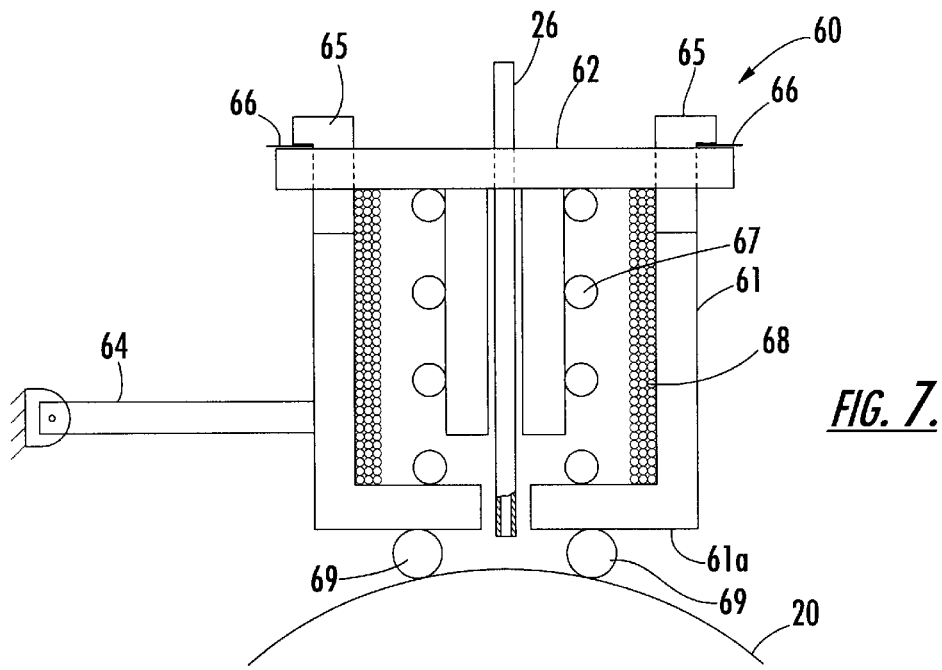
FIG. 7 illustrates a solenoid-assisted device for forming an opening within an egg shell according to embodiments of the present invention.

A solenoid-assisted punching device 60 is illustrated in FIG. 7 and includes a housing 61 operably associated with a pole piece 62. A punch 26 is rigidly attached to the pole piece 62 and moves with the pole piece 62. The housing 61 is attached to a support arm 64 which is configured to move the housing 61 into contacting relationship with an egg 20 prior to punching and away from the egg after punching. Arm 64 may have various configurations and may operate in various ways. For example, support arm 64 may move the housing 61 into and out of contact with an egg in a linear motion, in an arcuate motion, or in a combination of linear and arcuate motions.

The illustrated housing 61 is operably associated with the pole piece 62 via lugs 65 and clip 66, as would be understood by those skilled in the art of solenoid actuators. A spring 67 within the housing 61 keeps the pole piece 62 and punch 26 in an elevated position in the absence of electrical current through the solenoid coil 68.

In operation, when electrical current is applied to the coil 68, the pole piece 62 and punch 26 are driven downwardly at a speed in excess of 30 inches per second to pierce the shell of the egg 20. When electrical current is removed from the coil 68, the spring 67 urges the pole piece 62 and punch 26 upwardly away from the egg 20.

In the illustrated embodiment, energy-absorbing, compliant material 69 is attached to the bottom portion 61a of the housing 61. The energy-absorbing, compliant material 69 deflects (squashes) to absorb the motion of the housing 61 as well as deforms to spread these forces from stopping the punch 26 over a wide area of the shell to minimize cracks. The momentum of the housing 61 is imparted to the energy-absorbing, compliant material 69 as the energy-absorbing, compliant material 69 halts the motion of the punch 26. The energy-absorbing material 69 reduces the speed of the pole piece 62 and punch 26 immediately upon piercing of the egg shell by the punch 26. After penetrating the egg 20, the pole piece 62 impacts the solenoid housing 61 and imparts momentum to the housing according to $M_1*V_1$ (pole piece mass times velocity before impact)=$M_2*V_2$ (pole piece and housing after impact). The energy-absorbing material 69 may have various shapes and configurations and is not limited to the illustrated configuration. A solenoid-assisted device according to embodiments of the present invention may have various configurations and is not limited to the illustrated embodiment.

Figure 8:
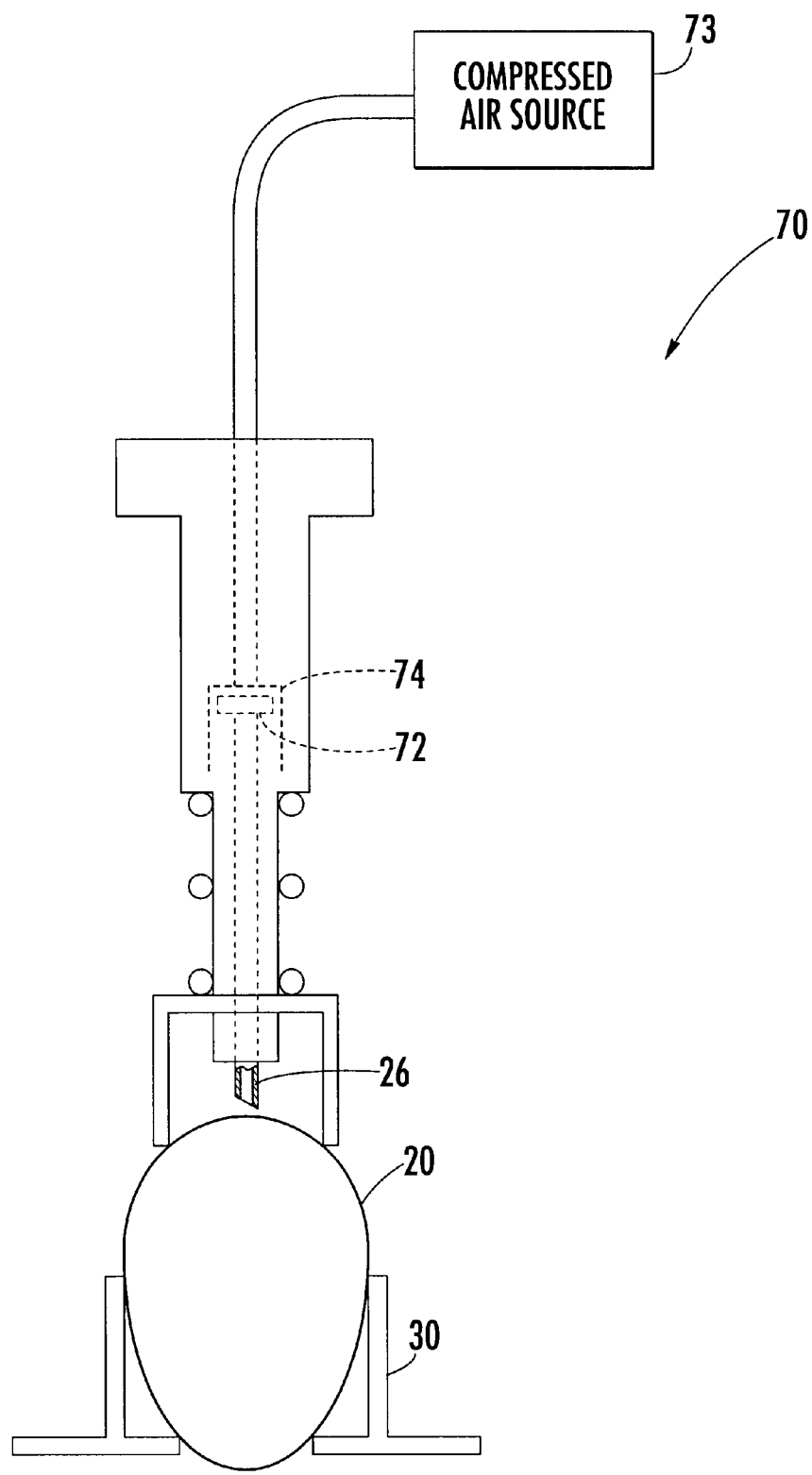
FIG. 8 illustrates a pneumatic-assisted device for forming an opening within an egg shell according to embodiments of the present invention.

With respect to pneumatic-assisted punching, a punch may be assisted by air or other compressed gases to achieve a punching speed in excess of 30 inches per second. FIG. 8 illustrates a pneumatic-assisted device 70 for forming an opening within an egg shell according to embodiments of the present invention. The illustrated device 70 includes a punch 26 fixedly attached to a piston 72 that is urged downwardly by compressed air (or other fluids/gases) entering the cylinder 74 from a source 73 to form an opening in an egg shell. The punch 26 can be returned to its original position via any manner known to those skilled in this art including mechanically, electromagnetically, and/or via suction. A pneumatic-assisted device according to embodiments of the present invention may have various configurations and is not limited to the illustrated embodiment.

According to embodiments of the present invention, a punch may be configured to deliver a treatment substance into an egg after forming an opening in a shell thereof. Treatment substance delivery may occur via a delivery needle disposed within the punch as is known to those skilled in the art.

Figure 9:
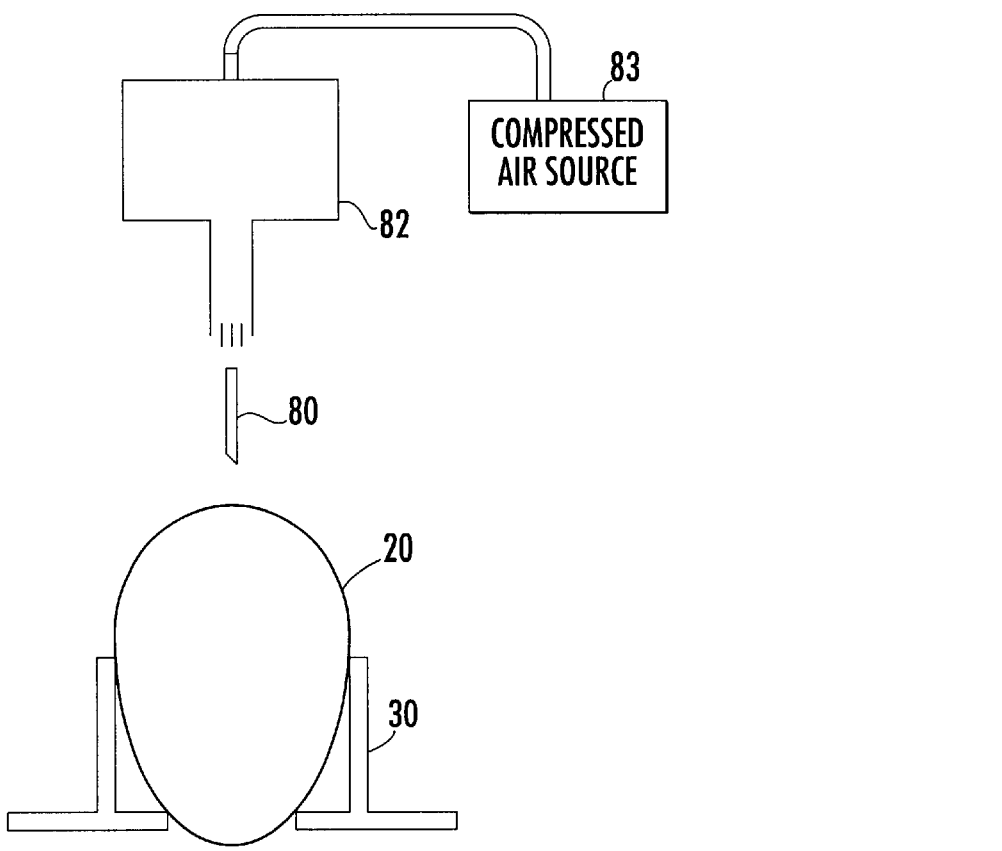
FIG. 9 illustrates a device for hurling a projectile at an egg shell to form an opening therein in accordance with embodiments of the present invention.

According to embodiments of the present invention, the shell of an egg may be pierced without causing cracking by hurling one or more small projectiles at the egg shell at speeds in excess of 30 inches per second. Preferably, a non-toxic, bio-degradable material (e.g., ice) is used as a projectile; however, various types of materials may be utilized. Embodiments of the present invention are not limited to the use of ice projectiles. Projectiles may be hurled at an egg via various mechanisms, including mechanical, hydraulic, and pneumatic mechanisms. FIG. 9 illustrates a projectile 80 (e.g., ice) being hurled at an egg shell from a device 82 in accordance with embodiments of the present invention. In the illustrated embodiment, the projectile is powered by compressed air from a compressed air source 83.

According to embodiments of the present invention, a projectile may contain a treatment substance to be injected within an egg. For example, an ice projectile may include a treatment substance to be injected within an egg.

According to other embodiments of the present invention, one or more projectiles may be hurled into an egg after an opening has been formed via a punch. These projectiles may be configured to penetrate one or more membranes within an egg and/or to deliver one or more treatment substances within an egg. These projectiles may be delivered via the punch or another device inserted within the opening or positioned adjacent the opening.

Projectiles according to embodiments of the present invention may have various shapes, sizes and configurations. For example, projectiles configured to form an opening within an egg shell may have an elongated, cylindrical shape similar to that of a conventional punch. Projectiles configured to be hurled within an egg after an opening has been formed may have a generally spherical shape. A first projectile utilized to form an opening within an egg shell may have a different shape and/or configuration than subsequent projectiles. For example, a first projectile may have an elongated, cylindrical shape for forming an opening and subsequent projectiles may have a spherical shape for delivering one or more treatment substances within an egg and/or for penetrating one or more membranes within an egg.

Projectiles formed of ice may be cast, as in an ice tray, using various types of refrigeration equipment and techniques known to those skilled in the art.

Figure 10:
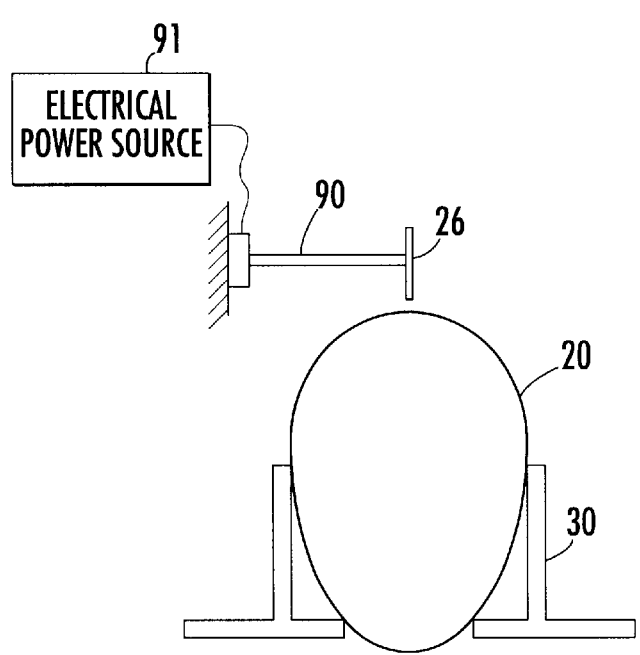
FIG. 10 illustrates a punch mounted to a piezoelectric actuator that is configured to vibrate rapidly when electrical energy from an electrical power source is applied thereto in accordance with embodiments of the present invention.

According to embodiments of the present invention, a punch may be mounted on a piezoelectric actuator configured to vibrate at frequencies in a range of between about 1,000 Hz and about 100,000 Hz. These frequencies effectively cause a punch to move at speeds in excess of 30 inches per second. In this embodiment, the shell may be pierced by successive impacts, each imparting small cracks at the point of impact until the shell cracks with a small net punch force. As is known to those of skill in the art, a piezoelectric actuator is a solid state device that converts electrical energy directly into motion. FIG. 10 illustrates a punch 26 mounted to a piezoelectric actuator 90 that is configured to vibrate rapidly when electrical energy from an electrical power source 91 is applied thereto in accordance with embodiments of the present invention. A piezoelectric device according to embodiments of the present invention may have various configurations and is not limited to the illustrated embodiment.

With respect to voice coil-assisted punching, a punch may be assisted by a voice coil device to achieve a punching speed in excess of 30 inches per second. Voice coil actuators are direct drive, limited motion devices that utilize a permanent magnet field and coil winding (conductor) to produce a force proportional to the current applied to the coil. Voice coil devices that may be utilized in accordance with embodiments of the present invention are available from BEI Technologies, Inc., Kimco Magnetics Division, 804-A Rancheros Drive, San Marcos, Calif.

Figure 11:
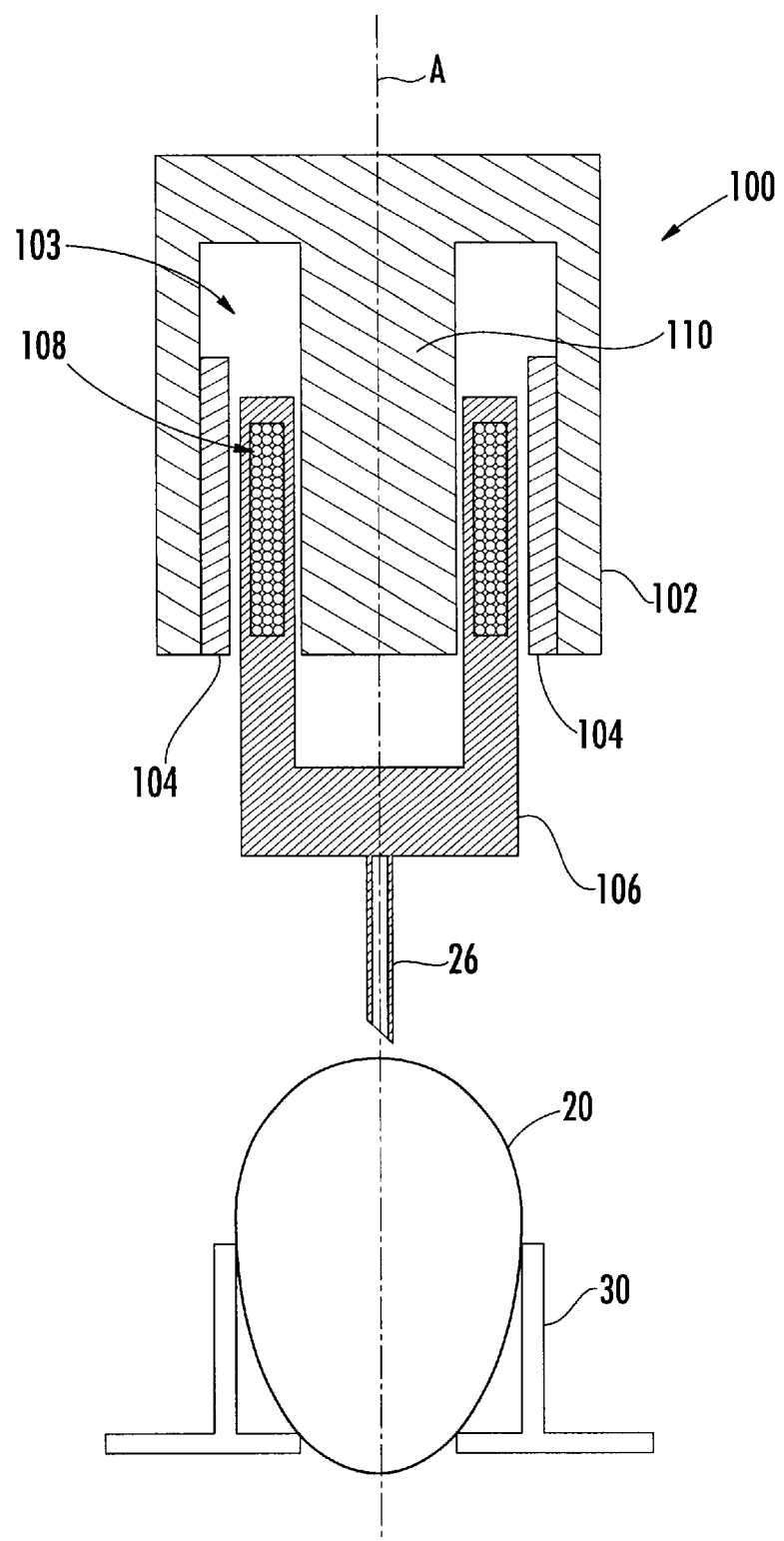
FIG. 11 illustrates a voice coil-assisted device for forming an opening within an egg shell according to embodiments of the present invention.

FIG. 11 illustrates an exemplary voice coil-assisted device 100 for forming an opening within an egg shell according to embodiments of the present invention. The illustrated device 100 includes a ferromagnetic cylinder housing 102 that includes a cylinder 103. A permanent magnet 104 is attached to the inside wall of the cylinder 103 as illustrated. A coil holder 106 is slidably disposed within the cylinder 103 along the longitudinal axis of the cylinder 103. A tubular coil of wire 108 is situated within the coil holder 106 as illustrated. An inner core of ferromagnetic material 110 set along the axial centerline of the coil completes the magnetic circuit. The force generated axially upon the coil 108 when current flows through the coil 108 will produce relative motion between the coil holder 106 and the cylinder housing 102, as would be understood by those skilled in the art.

In the illustrated embodiment, voice coil device 100 includes a punch 26 fixedly attached to the coil holder 106 that can be urged downwardly at speeds greater than or equal to 30 inches per second when current flows through the coil 108 as described above to form an opening in an egg shell. The punch 26 can be returned to its original position via any manner known to those skilled in this art.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of in ovo injection, comprising hurling a projectile at the egg shell at a speed equal to or greater than thirty (30) inches per second, wherein the projectile comprises a non-toxic, bio-degradable material.

2. The method of claim 1 further comprising orienting the egg into a predetermined position prior to hurling the projectile through the egg shell.

3. The method of claim 1 wherein the projectile comprises ice.

4. The method of claim 1 wherein the projectile comprises a substance that is released into the egg.

5. The method of claim 4 wherein the substance comprises a treatment substance for treating an avian embryo.

6. A method of in ovo injection, comprising:
 introducing an opening into a shell of an egg; and
 hurling a non-toxic, bio-degradable projectile through the opening, wherein the projectile comprises a predetermined dosage of a substance.

7. The method of claim 6 wherein the projectile comprises ice.

8. The method of claim 6 wherein the substance comprises a treatment substance for treating an avian embryo.

9. A method of in ovo injection, comprising:
 orienting an avian egg into a predetermined position;
 introducing an opening into a shell of the egg, comprising hurling projectile through the shell at a speed equal to or greater than thirty (30) inches per second, wherein the projectile comprises a non-toxic, biodegradable material;
 extending a delivery device through the opening and into the egg a predetermined depth; and
 releasing a predetermined dosage of a substance into the egg.

10. The method of claim 9, wherein the projectile comprises ice.

11. The method of claim 9, wherein the substance comprises a treatment substance for treating an avian embryo.

12. An in ovo injection apparatus, comprising an actuator configured to hurl a projectile through the shell at a speed equal to or greater than thirty (30) inches per second, wherein the projectile comprises a non-toxic, bio-degradable material.

13. The apparatus of claim 12, wherein the projectile comprises ice.

14. The apparatus of claim 12, further comprising a holder that orients an egg in a predetermined position.

15. The apparatus of claim 12, further comprising a delivery device configured to deliver a predetermined dosage of a substance into the egg via the opening.

16. The apparatus of claim 15, wherein the delivery device is configured to hurl a second projectile comprising a predetermined dosage of a substance into the egg via the opening.

17. The apparatus of claim 16, wherein the second projectile comprises a non-toxic, bio-degradable material.

18. The apparatus of claim 16, wherein the second projectile comprises ice.

19. The apparatus of claim 16 wherein the substance comprises a treatment substance for treating an avian embryo.

20. A method of in ovo injection, comprising moving a punch through the shell at a speed equal to or greater than thirty (30) inches per second, wherein the punch is attached to a piezoelectric actuator that vibrates within a frequency range of between about 1,000 Hz and about 100,000 Hz.

21. The method of claim 20, further comprising orienting the egg into a predetermined position prior to moving the punch through the egg shell.

22. The method of claim 20, further comprising limiting travel of the punch through the egg shell to a predetermined distance.

23. A method of in ovo injection, comprising:
 introducing an opening into a shell of the egg, comprising moving a punch through the shell at a speed equal to or greater than thirty (30) inches per second, wherein the punch is attached to a piezoelectric actuator and wherein the piezoelectric actuator vibrates within a frequency range of between about 1,000 Hz and about 100,000 Hz; and
 injecting a substance into the egg via the opening.

24. The method of claim 23, wherein the delivery device comprises a delivery needle.

25. The method of claim 23, wherein the substance comprises a treatment substance for treating an avian embryo.

26. A method of forming an opening in a shell of an avian egg such that the potential for cracking is reduced, wherein the egg is supported within a pocket of an egg flat, wherein the pocket comprises a plurality of compliant tabs that support the egg, the method comprising moving a punch through the shell at a speed that does not cause the compliant tabs supporting the egg to deflect.

27. The method of claim 26, wherein the speed of the punch is greater than or equal to thirty (30) inches per second.

28. A method of in ovo injection, comprising hurling a projectile at the egg shell at a speed equal to or greater than thirty (30) inches per second, wherein the projectile comprises ice.

29. The method of claim 28 wherein the projectile comprises a substance that is released into the egg.

30. The method of claim 29 wherein the substance comprises a treatment substance for treating an avian embryo.

31. A method of in ovo injection, comprising:
 introducing an opening into a shell of an egg; and
 hurling a projectile through the opening, wherein the projectile comprises ice and a predetermined dosage of a substance.

32. A method of in ovo injection, comprising:
 orienting an avian egg into a predetermined position;
 introducing an opening into a shell of the egg, comprising hurling a projectile through the shell at a speed equal to or greater than thirty (30) inches per second, wherein the projectile comprises ice;
 extending a delivery device through the opening and into the egg a predetermined depth; and
 releasing a predetermined dosage of a substance into the egg.

33. An in ovo injection apparatus, comprising an actuator configured to hurl a projectile through the shell at a speed equal to or greater than thirty (30) inches per second, wherein the projectile comprises ice.

34. The apparatus of claim 33, further comprising a holder that orients an egg in a predetermined position.

35. The apparatus of claim 33 further comprising a delivery device configured to deliver a predetermined dosage of a substance into the egg via the opening.

36. The apparatus of claim 35 wherein the delivery device is configured to hurl a second projectile comprising a predetermined dosage of a substance into the egg via the opening.

37. The apparatus of claim 36 wherein the second projectile comprises a non-toxic, bio-degradable material.

38. The apparatus of claim 36 wherein the second projectile comprises ice.

39. The apparatus of claim 36 wherein the substance comprises a treatment substance for treating an avian embryo.

40. An in ovo injection apparatus, comprising:

an actuator configured to hurl a first projectile through the shell at a speed equal to or greater than thirty (30) inches per second; and a delivery device configured to deliver a predetermined dosage of a substance into the egg via the opening, wherein the delivery device is configured to hurl a second projectile comprising a predetermined dosage of a substance into the egg via the opening, wherein the second projectile comprises a non-toxic, bio-degradable material.

41. An in ovo injection apparatus, comprising:

an actuator configured to hurl a first projectile through the shell at a speed equal to or greater than thirty (30) inches per second; and a delivery device configured to deliver a predetermined dosage of a substance into the egg via the opening, wherein the delivery device is configured to hurl a second projectile comprising a predetermined dosage of a substance into the egg via the opening, and wherein the second projectile comprises ice.

* * * * *